United States Patent
Huang et al.

(10) Patent No.: US 9,907,053 B2
(45) Date of Patent: Feb. 27, 2018

(54) CONTROL NODE RESOURCE SELECTION AND ALLOCATION METHOD AND DEVICE

(71) Applicant: ZTE Corporation, Shenzhen (CN)

(72) Inventors: Ying Huang, Shenzhen (CN); Lin Chen, Shenzhen (CN); Feng Xie, Shenzhen (CN); Yumin Luo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/035,111

(22) PCT Filed: Jun. 9, 2014

(86) PCT No.: PCT/CN2014/079512
§ 371 (c)(1),
(2) Date: Jun. 2, 2016

(87) PCT Pub. No.: WO2014/180429
PCT Pub. Date: Nov. 13, 2014

(65) Prior Publication Data
US 2016/0316452 A1 Oct. 27, 2016

(30) Foreign Application Priority Data

Nov. 7, 2013 (CN) .......................... 2013 1 0553136

(51) Int. Cl.
*H04W 72/04* (2009.01)
*H04W 72/00* (2009.01)
(Continued)

(52) U.S. Cl.
CPC ......... *H04W 72/005* (2013.01); *H04W 4/008* (2013.01); *H04W 76/00* (2013.01);
(Continued)

(58) Field of Classification Search
CPC combination set(s) only.
See application file for complete search history.

(56) References Cited

U.S. PATENT DOCUMENTS 8,254,301 B2 * 8/2012 Chen ...................... G08G 1/163
370/315
8,504,042 B2 8/2013 Chien
(Continued)

FOREIGN PATENT DOCUMENTS

CN 101594287 A 12/2009
CN 102170641 A 8/2011
(Continued)

OTHER PUBLICATIONS

International Search Report in international application No. PCT/CN2014/079512, dated Sep. 2, 2014.
(Continued)

*Primary Examiner* — Cindy Trandai
(74) *Attorney, Agent, or Firm* — Oppedahl Patent Law Firm LLC (57) ABSTRACT

The present invention discloses a control node resource selection and allocation method and device, wherein said method comprises: a first D2D device sends control node broadcast information; said first D2D UE is confirmed as the control node.

10 Claims, 4 Drawing Sheets

(51) Int. Cl.
  *H04W 76/00*   (2018.01)
  *H04W 4/00*    (2018.01)
  *H04W 76/02*   (2009.01)
  *H04W 8/00*    (2009.01)
  *H04W 88/06*   (2009.01)

(52) U.S. Cl.
  CPC ....... *H04W 76/002* (2013.01); *H04W 76/021* (2013.01); *H04W 76/023* (2013.01); *H04W 8/005* (2013.01); *H04W 88/06* (2013.01)

(56) References Cited

U.S. PATENT DOCUMENTS

| | | | | |
|---|---|---|---|---|
| 9,055,390 | B2* | 6/2015 | Lor | H04W 76/02 |
| 9,661,658 | B2* | 5/2017 | Li | H04W 28/02 |
| 9,736,817 | B2 | 8/2017 | Fodor et al. | |
| 9,788,186 | B2 | 10/2017 | Chatterjee et al. | |
| 2004/0116074 | A1* | 6/2004 | Fujii | G06K 7/0008 455/41.2 |
| 2005/0077356 | A1* | 4/2005 | Takayama | G06K 7/10237 235/451 |
| 2006/0045055 | A1* | 3/2006 | Ramadas | H04W 84/20 370/338 |
| 2009/0034432 | A1 | 2/2009 | Bonta | |
| 2011/0055424 | A1 | 3/2011 | Jiang | |
| 2011/0225305 | A1 | 9/2011 | Vedantham | |
| 2011/0243010 | A1 | 10/2011 | Geirhofer | |
| 2011/0282989 | A1 | 11/2011 | Geirhofer | |
| 2011/0317569 | A1* | 12/2011 | Kneckt | H04L 5/00 370/252 |
| 2012/0093098 | A1* | 4/2012 | Charbit | H04W 72/04 370/329 |
| 2012/0307764 | A1* | 12/2012 | Zhao | H04W 28/24 370/329 |
| 2012/0317199 | A1 | 12/2012 | Nam | |
| 2013/0059583 | A1 | 3/2013 | Van Phan | |
| 2013/0109301 | A1 | 5/2013 | Hakola | |
| 2013/0185373 | A1 | 7/2013 | Vandwalle et al. | |
| 2013/0250771 | A1* | 9/2013 | Yu | H04W 76/023 370/241 |
| 2013/0272262 | A1* | 10/2013 | Li | H04W 28/02 370/330 |
| 2013/0308549 | A1* | 11/2013 | Madan | H04W 28/26 370/329 |
| 2013/0308551 | A1* | 11/2013 | Madan | H04W 72/0406 370/329 |
| 2014/0023008 | A1 | 1/2014 | Ahn | |
| 2014/0094183 | A1* | 4/2014 | Gao | H04W 72/048 455/450 |
| 2014/0315562 | A1 | 10/2014 | Lim et al. | |
| 2015/0004901 | A1 | 1/2015 | Agiwal et al. | |
| 2015/0045078 | A1* | 2/2015 | Lee | H04W 76/021 455/509 |
| 2015/0156806 | A1 | 6/2015 | Pan | |
| 2016/0007338 | A1 | 1/2016 | Van Phan et al. | |
| 2016/0021526 | A1* | 1/2016 | Niu | H04W 74/02 370/230 |
| 2016/0088458 | A1* | 3/2016 | Chae | H04W 8/005 370/328 |
| 2016/0095144 | A1* | 3/2016 | Lindoff | H04W 76/023 370/329 |
| 2016/0113050 | A1* | 4/2016 | Li | H04W 52/0209 370/329 |
| 2016/0183251 | A1* | 6/2016 | Zhu | H04W 8/005 370/336 |
| 2016/0212594 | A1* | 7/2016 | Morita | H04W 52/0216 |
| 2016/0212779 | A1 | 7/2016 | Zhao | |
| 2016/0286507 | A1* | 9/2016 | Yang | H04W 8/005 |
| 2016/0309306 | A1* | 10/2016 | Morita | H04W 52/0216 |
| 2016/0337097 | A1* | 11/2016 | Martin | H04W 72/04 |

FOREIGN PATENT DOCUMENTS

| | | |
|---|---|---|
| CN | 102231899 A | 11/2011 |
| CN | 102246575 A | 11/2011 |
| CN | 102368863 A | 3/2012 |
| CN | 102547871 A | 7/2012 |
| CN | 102595314 A | 7/2012 |
| CN | 103179674 A | 6/2013 |
| CN | 103298141 A | 9/2013 |
| CN | 103313406 A | 9/2013 |
| CN | 103369585 A | 10/2013 |
| CN | 103517276 A | 1/2014 |
| CN | 103517371 A | 1/2014 |
| KR | 20070012045 A | 1/2007 |
| KR | 20080110000 A | 12/2008 |
| WO | 2009018251 A1 | 2/2009 |
| WO | 2011116815 A1 | 9/2011 |
| WO | 2012091420 A2 | 7/2012 |
| WO | 2013062351 A1 | 5/2013 |
| WO | 2013120267 A1 | 8/2013 |
| WO | 2013177179 A1 | 11/2013 |

OTHER PUBLICATIONS

English Translation of the Written Opinion of the International Search Authority in international application No. PCT/CN2014/079512, dated Sep. 2, 2014.

Partial Supplementary European Search Report in European application No. 14794225.4 dated Oct. 18, 2016.

Device to device communications with WiFi Direct: overview and experimentation, Jan. 11, 2013.

Supplementary European Search Report in European application No. 14794225.4, dated Feb. 14, 2017.

Huawei et al: "Need of a controlling node in PS D2D group communication", 3GPP ORAFT; R2-134134, 3rd Generation Partnership Project (3GPP), Mobile Competence Centre ; 650, Route Oes Lucioles ; F-06921 Sophia-Antipolis Ceoex ; France, vol. RAN WG2, No. San Francisco, U.S; Nov. 11, 2013-Nov. 15, 2013 Nov. 2, 2013 (Nov. 2, 2013), XP050753369,Retrieved from the Internet: URL:http://www.3gpp.org/ftp/tsg_ran/WG2_RL2  /TSGR2_84/ Docs [retrieved on Nov. 2, 2013].

Design and Implementation of Group Communication Function for Clustering Nodes in MANET, mailed on Oct. 2008.

The Design and Implementation of the Group Communication of the Clustering Nodes in MANET, mailed on May 2007.

International Search Report in international application No. PCT/CN2014/084114, dated Nov. 4, 2014.

English Translation of the Written Opinion of the International Search Authority in international application No. PCT/CN2014/084114, dated Nov. 4, 2014.

Supplementary European Search Report in European application No. 14880606.0, dated Jan. 5, 2017.

ETRI: "Discussion on Inter-Cell D2D Discovery" ,3GPP Draft; R2-134149 Discussion on Inter-Cell D2D Discovery, 3rd Generation Partnership Project (3GPP), Mobile Competence Centre ; 650, Route Des Lucioles ; F-06921 Sophia-Antipolis Cedex; France,vol. RAN WG2, No. San Francisco, USA; 20131111-2013111513 Nov. 2013 (Nov. 13, 2013),XP050736922,Retrieved from the Intemet:URL:http://www.3gpp.org/ftp/Meetings  3GPPSYNC/RAN/RAN2/Docs/, mailed on Nov. 13, 2013.

International Search Report in international application No. PCT/CN2014/071488, dated Oct. 29, 2014.

English Translation of the Written Opinion of the International Search Authority in international application No. PCT/CN2014/071488, dated Oct. 29, 2014.

Supplementary European Search Report in European application No. 14879430.8, dated Feb. 14, 2017.

* cited by examiner

CONTROL NODE RESOURCE SELECTION AND ALLOCATION METHOD AND DEVICE

TECHNICAL FIELD

The disclosure relates to the field of mobile communications, and in particular to a method and device for selecting a control node and allocating resources.

BACKGROUND

With the development of wireless multimedia service, people have growing requirements for high data rate and user experience, so a Device-to-Device (D2D) technology emerges as required. The application of the D2D technology can reduce the burden of a cellular network, reduce the battery power consumption of a User Equipment (UE), increase the data rate, and improve the robustness of network infrastructure, thereby meeting the requirements of high data rate services and neighbouring services well.

The D2D technology can work in a licensed frequency band or an unlicensed frequency band, and allow a plurality of D2D UEs supporting a D2D function to perform direct discovery/direct communication in the presence of network infrastructure or in the absence of network infrastructure. The direct communication among the D2D UEs can be performed based on a contention manner like the Carrier Sense Multiple Access/Collision Detect (CSMA/CD), specifically, before sending data, each D2D UE first performs carrier sense, that is, the D2D UE senses whether a channel is idle; if the channel is idle, the D2D UE allows data transmission; if a collision is sensed, the D2D UE retries after waiting for a period of random time; when the data is being sent, the D2D UE needs to continue sensing; if a collision is sensed, the D2D UE stops sending data immediately and waits for a period of random time. The above communication way among the D2D UEs is relatively simple and easy to be implemented; but when the number of nodes is large, there are many collisions, which causes the degradation of system performance. For solving the above problem, a method based on centralized control can be adopted for the communication among the D2D UEs: there is a central control node among the D2D UEs, the direct communication among the D2D UEs is managed and controlled by the control node, and the way is similar to the existing cellular communication. However, by using the method, it is impossible to select a control node and perform effective resource management and negotiation on D2D UEs in the absence of cellular network coverage.

SUMMARY

In view of the above, the disclosure provides a method and device for selecting a control node and allocating resources, which can select a control node and perform effective resource management and negotiation on a D2D UE in the absence of cellular network coverage.

To this end, the technical solutions of the disclosure are implemented as follows.

A method for selecting a control node is provided, which includes:

a first D2D UE sends control node broadcast information; and the first D2D UE is determined as the control node.

In the above solution, the step that the first D2D UE sends the control node broadcast information may include: the first D2D UE senses a carrier frequency for D2D communication, and determines whether control node pre-broadcast information sent by a neighbouring D2D UE is received; if the control node pre-broadcast information is received, it is compared whether a collision resolution Identification (ID) value of the neighbouring D2D UE is less than a collision resolution ID value of the first D2D UE; if yes, the first D2D UE sends the control node broadcast information; or else, the first D2D UE performs no operations; if the control node pre-broadcast information is not received, the first D2D UE directly sends the control node broadcast information.

In the above solution, the step that the first D2D UE sends the control node broadcast information may include: the first D2D UE senses the carrier frequency for D2D communication; if the control node broadcast information sent by other control nodes is not received, the first D2D UE sends the control node broadcast information; or the first D2D UE senses the carrier frequency for D2D communication; if the first D2D UE receives the control node broadcast information sent by other control nodes, and the signal intensity of the control node broadcast information sent by other control nodes is less than a preset threshold, the first D2D UE sends the control node broadcast information.

In the above solution, the step that the first D2D UE sends the control node broadcast information may include: if the first D2D UE is preconfigured as the control node, the first D2D UE sends the control node broadcast information.

In the above solution, the control node pre-broadcast information may include: the collision resolution ID value; and the collision resolution ID value may be calculated by the D2D UE according to specified parameters or selected randomly.

In the above solution, the control node pre-broadcast information may include at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

In the above solution, the control node broadcast information may include: type indication information which is used for indicating whether the D2D UE has a control node identity.

In the above solution, the control node broadcast information may include at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

In the above solution, the method may further include: the first D2D UE sends the control node pre-broadcast information.

In the above solution, the method may further include: before the first D2D UE sends the control node pre-broadcast information, the first D2D UE determines whether the control node broadcast information or the control node pre-broadcast information is received at the carrier frequency for D2D communication, and if the control node broadcast information or the control node pre-broadcast information is received, it is determined whether the signal intensity of the received control node broadcast information or control node pre-broadcast information is greater than the preset threshold;

the method may further include: after the first D2D UE sends the control node pre-broadcast information, the method further includes that: it is determined whether the control node pre-broadcast information sent by the neighbouring D2D UE is received.

A method for a control node to allocate resources is also provided, which includes:

after a first D2D UE is determined as the control node, the first D2D UE sends and receives control node information via an air interface; and the first D2D UE uses the control node information to allocate resources.

In the above solution, the control node information may include at least one of:

control node ID information, level information, subframe pattern information, wireless resource configuration information, information about a group ID list, information about a D2D UE wireless side ID list, information about a group wireless side ID list, and information about a mapping table of group IDs and group wireless side IDs.

In the above solution, the step that the first D2D UE uses the control node information to allocate resources may include:

the first D2D UE configures, according to the received control node information, a D2D UE managed by the first D2D UE with wireless resources, herein the wireless resources are different from wireless resources used by a D2D UE managed by a neighbouring control node; and/or according to the received control node information, the first D2D UE staggers, in the time domain, wireless resources for sending information between the neighbouring control node and the first D2D UE and wireless sources used for serving all D2D UEs managed by the first D2D UE.

A control node is also provided, which includes: a sending unit, which is configured to send the control node broadcast information; and an information processing unit, which is configured to determine a D2D UE where the information processing unit is located as the control node.

In the above solution, the control node may further include: a receiving unit, which is configured to sense information sent by the neighbouring D2D UE;

correspondingly, the information processing unit may be further configured to: determine whether the receiving unit receives the control node pre-broadcast information sent by the neighbouring D2D UE; if the control node pre-broadcast information is received, compare whether a collision resolution ID value of the neighbouring D2D UE is less than a collision resolution ID value of a first D2D UE; if yes, send the control node broadcast information; or else, perform no operations; if the control node pre-broadcast information is not received, directly send the control node broadcast information.

In the above solution, the information processing unit may be further configured to sense, through the receiving unit, the carrier frequency for D2D communication, and if control node broadcast information sent by other control nodes is not received, send the control node broadcast information; or the information processing unit may be configured to sense the carrier frequency for D2D communication, and if the control node broadcast information sent by other control nodes is received, and the signal intensity of the control node broadcast information sent by other control nodes is less than the preset threshold, send the control node broadcast information.

In the above solution, the information processing unit may be configured to, if the D2D UE where the information processing unit is located is preconfigured as the control node, send the control node broadcast information.

In the above solution, the control node pre-broadcast information may include: the collision resolution ID value; herein the collision resolution ID value is calculated by the D2D UE according to the specified parameters or selected randomly.

In the above solution, the control node pre-broadcast information may include at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

In the above solution, the control node broadcast information may include: type indication information which is used for indicating whether the D2D UE has a control node identity.

In the above solution, the control node broadcast information may include at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

In the above solution, the information processing unit may be further configured to send the control node pre-broadcast information.

In the above solution, the information processing unit is further configure to, before sending the control node pre-broadcast information, determine whether the control node broadcast information or the control node pre-broadcast information is received at the carrier frequency for D2D communication, and if the control node broadcast information or the control node pre-broadcast information is received, determine whether the signal intensity of the received control node broadcast information or control node pre-broadcast information is greater than the preset threshold;

the information processing unit is further configure to, after sending the control node pre-broadcast information, determine whether the control node pre-broadcast information sent by the neighbouring D2D UE is received.

A control node is also provided, which includes: a receiving and sending unit, and a processing unit; in which:

the receiving and sending unit is configured to, after the D2D UE is determined as the control node, send and receive the control node information via the air interface, and send the received control node information to the processing unit; and the processing unit is configured to use the control node information to allocate resources.

In the above solution, the control node information may include at least one of:

control node ID information, level information, subframe pattern information, wireless resource configuration information, information about a group ID list, information about a D2D UE wireless side ID list, information about a group wireless side ID list, and information about a mapping table of group IDs and group wireless side IDs.

In the above solution, the processing unit may be specifically configured to: configure, according to the received control node information, D2D UEs managed by the control node with different wireless resources; and/or stagger, in the time domain, resources of all D2D UEs managed by the control node and of D2D UEs managed by other control nodes.

The method and device for selecting a control node and allocating resources provided by the disclosure can determine the D2D UE as the control node by sending the control node broadcast information, thereby the control node can be selected in the absence of cellular network coverage.

In addition, after the D2D UE is determined as the control node, the D2D UE can send and receive the control node information via the air interface, and uses the control node information to allocate resources, so the selected control node can perform effective resource management and consultation on D2D UEs managed by it in the absence of cellular network coverage.

DETAILED DESCRIPTION

The basic idea of the disclosure is that: a first D2D UE sends control node broadcast information; and the first D2D UE is determined as a control node.

The disclosure is described below in combination with the accompanying drawings and specific embodiments in detail.

Embodiment 1

Figure 1:
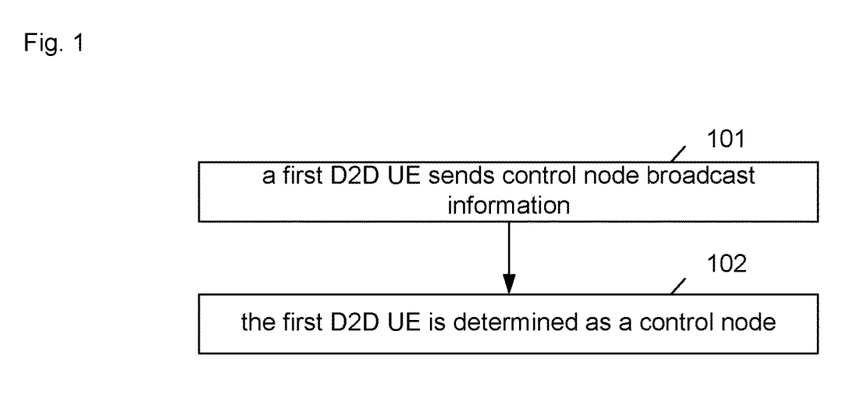
FIG. 1 is a first flowchart of a method for selecting a control node according to the disclosure.

As shown in FIG. 1, a method for selecting a control node provided by the present embodiment includes the following steps:

Step 101: a first D2D UE sends control node broadcast information; and

Step 102: the first D2D UE is determined as a control node.

Here, the control node broadcast information includes: type indication information of the control node; the type indication information is used for indicating whether the D2D UE has a control node identity.

Preferably, the control node broadcast information may also include: the control node ID information, the synchronization information, the effective duration, the level information, the access related information, the wireless resource configuration information, the information about the group ID list, the information about the D2D UE wireless side ID list, the information about the group wireless side ID list, and the information about the mapping table of group IDs and group wireless side IDs.

Specifically, the control node ID information is used for identifying the control node; the synchronization information is used for the D2D UE and the first D2D UE to perform synchronization; the effective duration indicates the effective duration of the control node identity of the D2D UE; the level information indicates the grade or priority of the D2D UE; the access related information indicates information related to access to the control node; the wireless resource configuration information indicates configuration information about the wireless resources used by a D2D UE which is served by the control node or the neighbouring control node; the wireless resource configuration information is time domain and/or frequency domain configuration information; the group ID is ID information of a D2D UE group which is served by the control node or the neighbouring control node; the group ID list is a group ID list of a D2D UE group which is served by the control node; the D2D UE wireless side ID is used for identifying a D2D UE it serves; the D2D UE wireless side ID list is the wireless side ID list of D2D UEs which are served by the control node; the group wireless side ID is used for identifying a group composed of the D2D UEs it serves; the D2D UE uses the group wireless side ID to perform a D2D group communication; the group wireless side ID list is the wireless side ID list of the D2D UE group which is served by the control node.

The wireless resource configuration information includes subframe pattern information; the subframe pattern information indicates time domain information of serving D2D UEs served by the control node.

The step that the first D2D UE sends the control node broadcast information may also include: the first D2D UE sends control node pre-broadcast information, and senses whether the control node pre-broadcast information sent by a neighbouring D2D UE is received; if the control node pre-broadcast information is received, it is compared whether a collision resolution ID value of the neighbouring D2D UE is less than a collision resolution ID value of the first D2D UE; if yes, the first D2D UE sends the control node broadcast information; or else, the first D2D UE performs no operations; if the control node pre-broadcast information is not received, the first D2D UE directly sends the control node broadcast information.

Or, the step that the first D2D UE sends the control node broadcast information may also include: the first D2D UE senses the carrier frequency for D2D communication; if the control node broadcast information is not received, or the control node broadcast information is received and the signal intensity of the control node broadcast information is less than the preset threshold, the first D2D UE sends the control node broadcast information;

herein, the preset threshold can be preconfigured by the first D2D UE or obtained from the network side.

Or, the method may also include: before the first D2D UE sends the control node broadcast information, the first D2D UE is preconfigured with the control node identity.

Herein, the control node pre-broadcast information includes: the collision resolution ID value. The collision resolution ID value is calculated by the D2D UE according to the specified parameters or selected randomly.

The collision resolution ID value can be calculated by the first D2D UE according to at least one of the following specified parameters: information about remaining power supply capacity, information about its own transmitting power, information about its own capability, a cellular network signal condition, level information and moving state information; for example, the information about remaining power supply capacity is taken as the collision resolution ID value, or the information about its own transmitting power is taken as the collision resolution ID value.

Herein, the level information indicates the grade or priority of the D2D UE and is preconfigured in the D2D UE. The moving state information is obtained according to a moving speed of the D2D UE.

The control node pre-broadcast information may also include: information included in the control node broadcast information.

Embodiment 2

Figure 2:
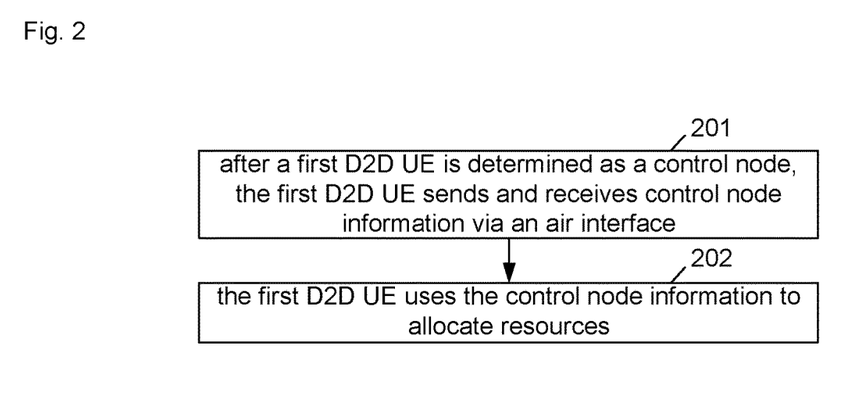
FIG. 2 is a first flowchart of a method for a control node to allocate resources according to the disclosure.

The present embodiment provides a method for a control node to allocate resources, which includes the following steps:

Step 201: after a first D2D UE is determined as the control node, the first D2D UE sends and receives control node information via an air interface; and Step 202: the first D2D UE uses the control node information to allocate resources.

Preferably, the control node information is sent to another control node by the control node or received from another control node.

The control node information includes at least one of:

control node ID information, which identifies the control node;

level information, which indicates the grade or priority of the D2D UE;

subframe pattern information, which indicates the time domain information of serving D2D UEs served by the control node or time domain information available for communication between control nodes;

the wireless resource configuration information, which indicates the configuration information about the wireless resources used by a D2D UE which is served by the control node or the neighbouring control node; the wireless resource configuration information is time domain and/or frequency domain configuration information;

the group ID list information, herein a group ID indicates ID information of a D2D UE group which is served by the control node or the neighbouring control node, and a group ID list is a group ID list of D2D UE groups which are served by the control node;

the information about the D2D UE wireless side ID list, herein a D2D UE wireless side ID is used for identifying a D2D UE it serves, and a D2D UE wireless side ID list is a wireless side ID list of D2D UEs which are served by the control node;

the information about the group wireless side ID list, herein the group wireless side ID is used for identifying the group composed of D2D UEs which are served by the control node, the D2D UE uses the group wireless side ID to perform the D2D group communication, and the group wireless side ID list is the wireless side ID list of the D2D UE group which is served by the control node; and the information about the mapping table of group IDs and group wireless side IDs.

The step that the first D2D UE uses the control node information to allocate resources includes:

according to the received control node information, the first D2D UE configures D2D UEs managed by it with different resources; and/or according to the received control node information, the first D2D UE staggers, in time domain, the resources of all D2D UEs managed by it and of D2D UEs managed by other control nodes.

Embodiment 3

Figure 3:
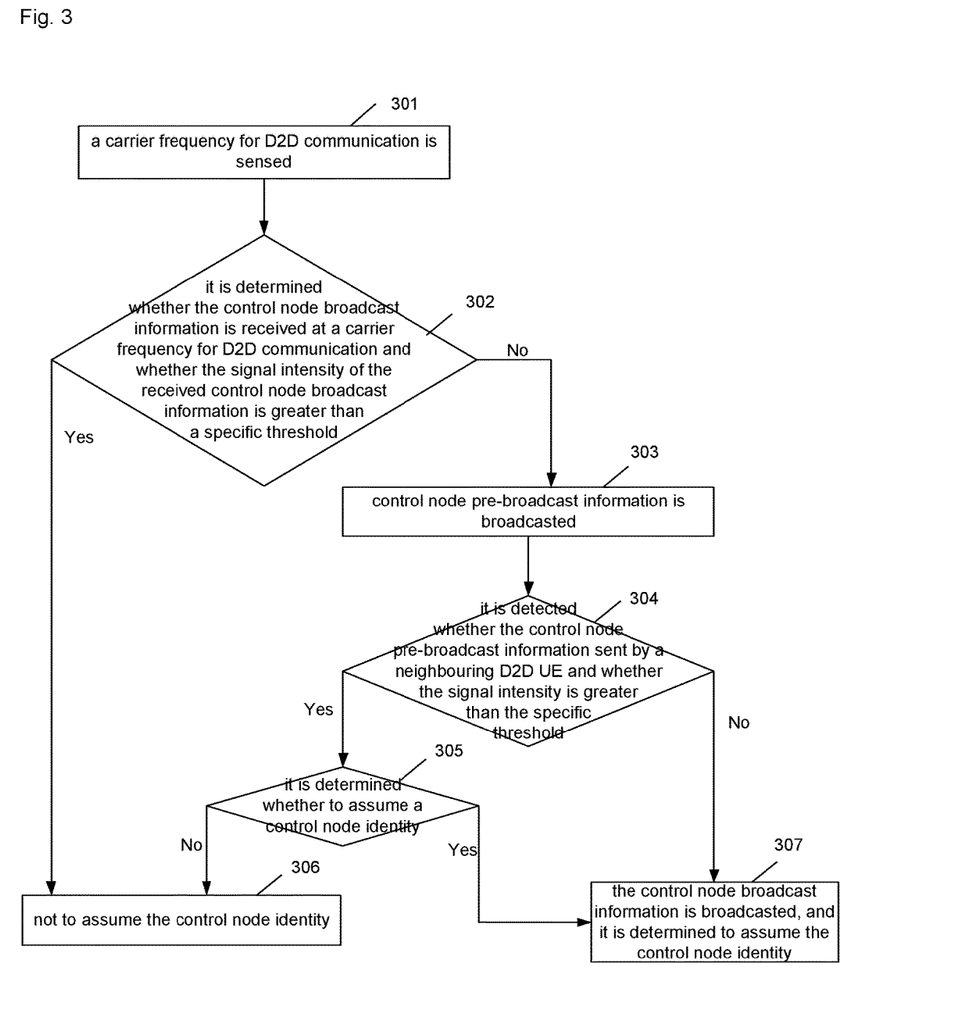
FIG. 3 is a second flowchart of a method for selecting a control node according to the disclosure.

As shown in FIG. 3, a method for selecting a control node provided by the present embodiment includes the following steps.

Step 301: a D2D UE senses a carrier frequency for D2D communication.

Here, the carrier frequency for D2D communication can be preconfigured in the UE, or configured by the network side in the presence of cellular network coverage. For example, the D2D UE can start sensing the carrier frequency for D2D communication in the absence of cellular network coverage or based on the triggering of a communication event.

Step 302: the D2D UE determines whether the control node broadcast information is received at the carrier frequency for D2D communication and the signal intensity is greater than the preset threshold; if not, Step 303 is performed; or else, Step 306 is performed.

Herein, the control node broadcast information is the control node broadcast information or the control node pre-broadcast information; wireless resource information of the control node broadcast information received by the D2D UE can be preconfigured in the D2D UE or obtained from the network side in the presence of cellular network coverage.

Herein, the control node broadcast information may include the following information:

1) the control node ID information, which can uniquely identify the control node in a certain geographical range, and can be preconfigured in the D2D UE or selected by the D2D UE itself;

2) the type indication information, which indicates whether the D2D UE has the control node identity;

3) the synchronization information, which is used for the D2D UE broadcasting the control node broadcast information to perform synchronization;

4) the effective duration, which indicates the effective duration of the control node identity of the D2D UE;

5) the level information, which indicates the grade or priority of the D2D UE;

6) the access related information, which indicates the information related to access to the control node;

7) the wireless resource configuration information, which indicates the configuration information about the wireless resources used by the D2D UE which is served by the control node or the neighbouring control node; the wireless resource configuration information includes the time domain and/or frequency domain configuration information;

preferably, the wireless resource configuration information may include the subframe pattern information which indicates the time domain information of serving D2D UEs served by the control node; in a subframe indicated by the subframe pattern, the control node can communicate with a D2D UE to be served; preferably, outside the indicated subframe, the control node can perform information interaction with a neighbouring control node;

8) the group ID list information, herein a group ID indicates ID information of a D2D UE group which is served by the control node or the neighbouring control node, and a group ID list is a group ID list of D2D UE groups which are served by the control node;

9) the information about the D2D UE wireless side ID list, herein a D2D UE wireless side ID is used for identifying the D2D UE it serves, and a D2D UE wireless side ID list is a wireless side ID list of D2D UEs which are served by the control node;

10) the information about the group wireless side ID list, herein the group wireless side ID is used for identifying the group composed of D2D UEs it serves; the D2D UE uses the group wireless side ID to perform the D2D group communication, for example, multicast data in the D2D group is scrambled by the group wireless side ID, and all the UE in the group can receive the D2D multicast data through the wireless side ID; the group wireless side ID list is the wireless side ID list of the D2D UE group which is served by the control node; and 11) the information about the mapping table of group IDs and group wireless side IDs.

In addition, except the control node broadcast information, the control node pre-broadcast information may also include the collision resolution ID value, that is, the control node pre-broadcast information may include the following information:

1) the collision resolution ID value, which is calculated by the D2D UE according to a predefined rule or selected randomly;

2) the control node ID information, which can uniquely identify the control node in a certain geographical range, and can be preconfigured in the D2D UE or selected by the D2D UE itself;

3) the type indication information, which indicates whether the D2D UE has the control node identity;

4) the synchronization information, which is used for the D2D UE broadcasting the control node broadcast information to perform synchronization;

5) the effective duration, which indicates the effective duration of the control node identity of the D2D UE;

6) the level information, which indicates the grade or priority of the D2D UE;

7) the access related information, which indicates the information related to access to the control node;

8) the wireless resource configuration information, which indicates the configuration information about the wireless resources used by the D2D UE which is served by the control node or the neighbouring control node; the wireless resource configuration information includes the time domain and/or frequency domain configuration information;

preferably, the wireless resource configuration information may include the subframe pattern information which indicates the time domain information of serving D2D UEs served by the control node; in the subframe indicated by the subframe pattern, the control node can communicate with a D2D UE to be served; preferably, outside the indicated subframe, the control node can perform information interaction with a neighbouring control node;

9) the group ID list information, herein a group ID indicates the ID information of a D2D UE group which is served by the control node or the neighbouring control node, and a group ID list is a group ID list of D2D UE groups which are served by the control node;

10) the information about the D2D UE wireless side ID list, herein a D2D UE wireless side ID is used for identifying the D2D UE it serves, and a D2D UE wireless side ID list is a wireless side ID list of D2D UEs which are served by the control node;

11) the information about the group wireless side ID list, herein a group wireless side ID is used for identifying a group composed of D2D UEs it serves; the D2D UE uses the group wireless side ID to perform the D2D group communication, for example, multicast data in the D2D group is scrambled by the group wireless side ID, and all UEs in the group can receive the D2D multicast data through the wireless side ID; the group wireless side ID list is the wireless side ID list of the D2D UE group which is served by the control node; and 12) the information about the mapping table of group IDs and group wireless side IDs.

Step 303: the D2D UE broadcasts the control node pre-broadcast information.

There are following four situations: 1) the D2D UE senses the carrier frequency for D2D communication, and the D2D control node broadcast information is not received;

2) the control node broadcast information is received by the D2D UE, and the signal intensity of the received the control node broadcast information is less than a preset threshold; herein the D2D UE can obtain the preset threshold by pre-configuring or obtain the preset threshold from the network side;

3) the control node broadcast information is received by the D2D UE, the received control node broadcast information includes the level information, and the grade of the neighbouring D2D control node is lower than the grade of the D2D UE; herein, the D2D UE can obtain its own level information by pre-configuring;

4) the D2D UE is preconfigured to have the control node identity.

The contents of the control node pre-broadcast information are described as in Step 302. Herein, the D2D UE can select the collision resolution ID value randomly, or obtain the collision resolution ID value by calculating according to the following information based on the predefined rule: the information about remaining power supply capacity, the information about its own transmitting power, the information about its own capability, the cellular network signal condition, the level information and the moving state information. Herein, the level information indicates the grade or priority of the D2D UE and is preconfigured in the D2D UE; the moving state information is obtained according to the moving speed of the D2D UE, for example, no speed, a low speed, a medium speed, a high speed, etc. Preferably, the more the remaining power supply capacity of the D2D UE, the greater the calculated collision resolution ID value; the greater its own transmitting power, the greater the collision resolution ID value; its own capability includes a control node capability, a synchronization capability, a resource management capability, an interference negotiation capability, and so on; the cellular network signal condition is a current cellular network signal condition of the D2D UE; the D2D UE whose signal condition is in a certain range is enabled to have a greater collision resolution ID value, the collision resolution ID value of the D2D UE at the edge of a cell may be greater than that of the D2D UE at the centre of the cell or without coverage, so that the D2D UE at the edge of the cell is more likely to be selected as the control node, in this way, the control node at the edge of the cell can manage and control D2D UEs served by it with the assistance of the cellular network, and can enable, as a relay node, a D2D UE out of coverage to communicate with the cellular network; the higher the level, the greater the collision resolution ID value; the lower the moving speed of a D2D UE, the greater its collision resolution ID value.

The D2D UE uses the preconfigured wireless resources to send the control node pre-broadcast information, or the D2D UE can also adopt a contention manner to select the resources in a resource pool to send the control node pre-broadcast information, herein specific resource pool information can be preconfigured in the D2D UE or obtained from the network side in the presence of cellular network coverage.

Step 304: the D2D UE detects whether the control node pre-broadcast information sent by the neighbouring D2D UE is received and whether the signal intensity of the received control node pre-broadcast information is greater than the preset threshold; if yes, Step 305 is performed; or else, Step 307 is performed.

Herein, the D2D UE can obtain the preset threshold by pre-configuring or obtain the preset threshold from the network side.

Step 305: it is determined, according to the collision resolution ID value included in the control node pre-broadcast information, whether to assume the control node identity; if yes, Step 307 is performed; or else, Step 306 is performed.

Step 306: the D2D UE determines not to assume the control node identity in below three situations, and accesses to the neighbouring control node, and then the processing flow is ended:

1) the collision resolution ID value of the neighbouring control node received by the D2D UE is greater than the collision resolution ID value of the D2D UE;

2) in Step 302, the control node broadcast information (the control node broadcast information or the control node pre-broadcast information) sent by the neighbouring D2D UE is received by the D2D UE, and the signal intensity is greater than the preset threshold;

3) in Step 302, the control node broadcast information (the control node broadcast information or the control node pre-broadcast information) sent by the neighbouring D2D UE is received by the D2D UE, the control node broadcast information includes the level information, and the grade of the neighbouring D2D UE is higher than the grade of the D2D UE.

Step 307: the D2D UE broadcasts the control node broadcast information, and determines to assume the control node identity:

1) the control node broadcast information sent by the neighbouring D2D UE is not detected by the D2D UE in Step 302, or the signal intensity of the detected control node broadcast information sent by the neighbouring D2D UE is less than the preset threshold;

2) the control node pre-broadcast information sent by the neighbouring D2D UE is not detected by the D2D UE in Step 304, or the signal intensity of the detected control node pre-broadcast information sent by the neighbouring D2D UE is less than the preset threshold;

3) the D2D control node pre-broadcast information sent by the neighbouring D2D UE is received by the D2D UE in Step 304, the D2D control node pre-broadcast information includes the level information, and the grade of the neighbouring D2D UE is higher than the grade of the D2D UE;

4) the control node pre-broadcast information sent by the neighbouring D2D UE is received by the D2D UE in Step 305, and the collision resolution ID value of the neighbouring D2D UE is less than the collision resolution ID value of the D2D UE.

Now the selection and determination of the control node of D2D UEs is completed.

Embodiment 4

Figure 4:
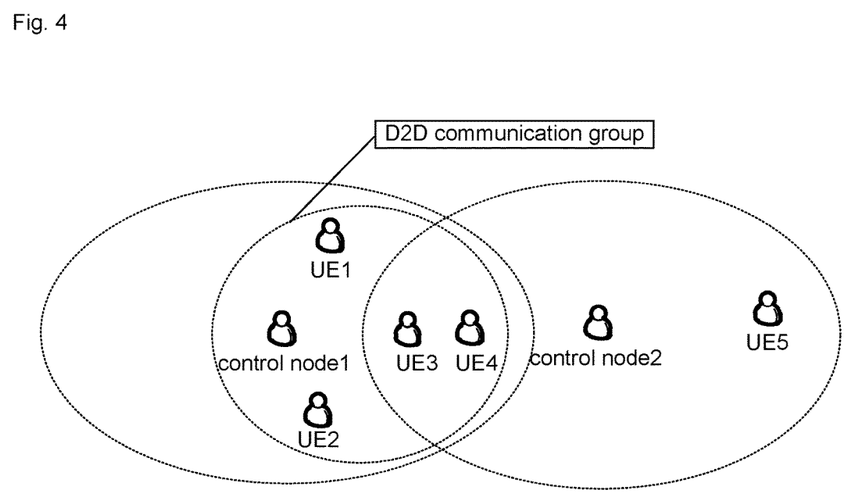
FIG. 4 is a schematic diagram showing composition of a system according to the disclosure.

The present embodiment describes a method for negotiation among control nodes under a scenario where multiple control nodes exist and areas they serve are overlapped; FIG. 4 is a schematic diagram of the scenario of the present embodiment. As shown in FIG. 4, the control node 1 and the control node 2 are neighbouring control nodes, and serving areas of the control node 1 and the control node 2 are overlapped. Specifically, the UE1, the UE2 and the UE3 are served by the control node 1, the UE4 and the UE5 are served by the control node 2. The UE1, the UE2, the UE3 and the UE4 belong to a same D2D group and can perform D2D group communication. The control node 1 and the control node 2 can perform information interaction, so as to implement wireless resource negotiation, interference management and other functions, and ensure the successful D2D communication among D2D UEs across the control nodes.

Figure 5:
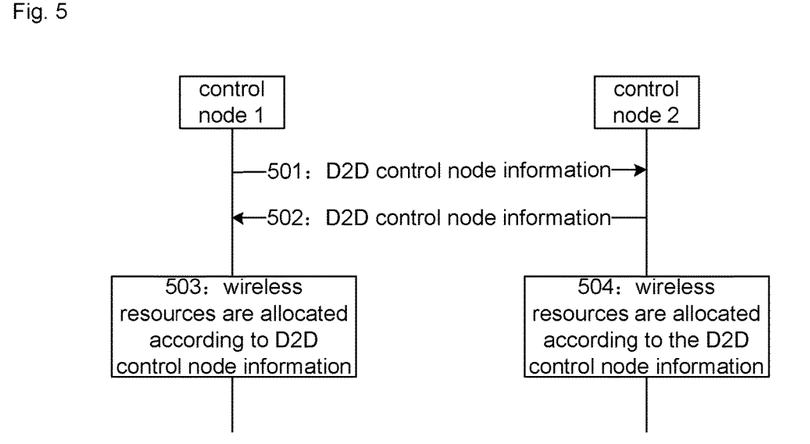
FIG. 5 is a second flowchart of a method for a control node to allocate resources according to the disclosure.

FIG. 5 is a flowchart of a method of the present embodiment.

Step 501: a control node 1 sends D2D control node information to a control node 2; specifically, the control node 1 sends the D2D control node information to the control node 2 via an air interface.

Herein, the D2D control node information may include the following contents:

1) control node ID information, which identifies a control node sending the D2D control node information;

2) level information, which indicates the grade of priority of the D2D UE;

3) subframe pattern information, which indicates time domain information of serving D2D UEs served by the control node or time domain information available for communication between control nodes;

4) wireless resource configuration information, which indicates the configuration information about the wireless resources used by a D2D UE which is served by the control node or the neighbouring control node;

5) group ID list information, herein a group ID indicates ID information of a D2D UE group which is served by the control node or the neighbouring control node; group ID information can be distributed by a D2D server (i.e. the ProSe server) or an application server; and a group ID list is a group ID list of D2D UE groups which are served by the control node;

6) information about a D2D UE wireless side ID list, herein a D2D UE wireless side ID is used for identifying a D2D UE it serves, and the D2D UE wireless side ID list is a wireless side ID list of D2D UEs which are served by the control node;

7) information about a group wireless side ID list, herein a group wireless side ID is used for identifying a group composed of D2D UEs it serves, the D2D UE uses the group wireless side ID to perform D2D group communication, and the group wireless side ID list is a wireless side ID list of D2D UE groups which are served by the control node; and 8) information about a mapping table of group IDs and group wireless side IDs.

Step 502: the control node 2 sends D2D control node information to the control node 1, herein the contents included in the D2D control node information are described as in Step 501.

Step 503-504: the control node 1 and the control node 2 determine, according to their respectively received D2D control node information, a wireless resource pool used by a D2D UE that they serve. Preferably, the control node 1 and the control node 2 avoid wireless resources used by a D2D UE that a neighbouring control node serves to reduce interference by avoiding that the D2D UE of the neighbouring control node uses the same wireless resources to perform the D2D communication, thereby improving the utilization of wireless resource.

Preferably, the received D2D control node information includes the information about the mapping table of group IDs and group wireless side IDs and the mapping table includes a group ID not stored in the control node, then the control node stores the group ID and a corresponding group wireless side ID, and broadcasts and sends them in the control node broadcast information. In this way, the successful D2D communication among the D2D UEs across the control nodes can be ensured. For example, the D2D UE4 in FIG. 4 is served by the control node 2, and all of the D2D UE1, UE2, UE3 are served by the control node 1, the D2D UE1, UE2, UE3 and UE4 belong to the same D2D UE group and perform a D2D multicast communication. Multicast communication data of the D2D UE group is scrambled by the group wireless side ID; if the UE4 wants to receive the multicast data of the D2D UE group, it needs to obtain a mapping relationship between the group ID and the group wireless side ID of the D2D UE group. In the scenario of FIG. 4, after obtaining, from the control node 1, the mapping relationship between the group ID and the group wireless side ID of the D2D UE group, the control node 2 sends the mapping relationship to the UE4 in a broadcast way or a unicast way.

Optionally, if the received D2D control node information includes the subframe pattern information that indicates the time domain information of serving the D2D UE served by the control node or the time domain information available for communication between the control nodes, then the control node staggers, according to the received D2D control node information, the time for serving a D2D UE served by a neighbouring control node and performs D2D control node information interaction with the neighbouring control node.

Embodiment 5

Figure 6:
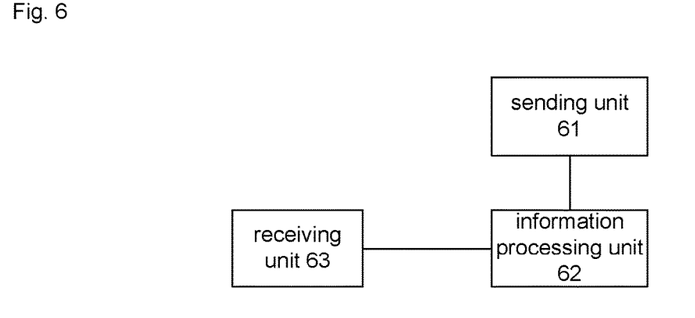
FIG. 6 is a first structure diagram of a control node according to the disclosure.

As shown in FIG. 6, a control node provided by the present embodiment includes:

a sending unit 61, which is configured to send control node broadcast information; and an information processing unit 62, which is configured to determine a D2D UE where it is located as the control node.

The control node further includes: a receiving unit 63, which is configured to sense information sent by a neighbouring D2D UE; correspondingly, the information processing unit 62 is further configured to: determine whether the receiving unit receives the control node pre-broadcast information sent by the neighbouring D2D UE; if the control node pre-broadcast information is received, compare whether a collision resolution ID value of the neighbouring D2D UE is less than a collision resolution ID value of a first D2D UE; if yes, send the control node broadcast information; or else, unit perform no operations; if the control node pre-broadcast information is not received, directly send the control node broadcast information.

The information processing unit 62 is further configured to sense, through the receiving unit, the carrier frequency for D2D communication, and if the control node broadcast information sent by other control nodes is not received, send the control node broadcast information; or the information processing unit 62 is further configured to sense the carrier frequency for D2D communication, and if the control node broadcast information sent by other control nodes is received and the signal intensity of the control node broadcast information sent by other control nodes is less than the preset threshold, send the control node broadcast information.

The information processing unit is configured to, if the D2D UE where the information processing unit is located is preconfigured as the control node, send the control node broadcast information.

The control node pre-broadcast information includes: the collision resolution ID value; wherein the collision resolution ID value is calculated by the D2D UE according to the specified parameters or selected randomly. The collision resolution ID value can be calculated by the first D2D UE according to at least one of the following specified parameters: information about remaining power supply capacity, information about its own transmitting power, information about its own capability, cellular network signal condition, level information and moving state information; for example, the information about remaining power supply capacity is taken as the collision resolution ID value, or the information about its own transmitting power is taken as the collision resolution ID value.

Herein, the level information indicates the grade or priority of the D2D UE and is preconfigured in the D2D UE. The moving state information is obtained according to a moving speed of the D2D UE.

The control node pre-broadcast information may also include: the information included in the control node broadcast information.

The control node broadcast information includes: the type indication information which is used for indicating whether the D2D UE has the control node identity.

The control node broadcast information includes: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs. Herein, the control node ID information is used for identifying the control node; the synchronization information is used for the D2D UE and the first D2D UE to perform synchronization; the effective duration indicates the effective duration of the control node identity of the D2D UE; the level information indicates the grade or priority of the D2D UE; the access related information indicates information related to access to the control node; the wireless resource configuration information indicates configuration information about the wireless resources used by the D2D UE which is served by the control node or the neighbouring control node; the wireless resource configuration information is time domain and/or frequency domain configuration information; the group ID indicates ID information of a D2D UE group which is served by the control node or the neighbouring control node; the group ID list is a group ID list of the D2D UE group which is served by the control node; the D2D UE wireless side ID is used for identifying the D2D UE it serves; the D2D UE wireless side ID list is the wireless side ID list of the D2D UE which is served by the control node; the group wireless side ID is used for identifying a group composed of D2D UEs it serves; the D2D UE uses the group wireless side ID to perform a D2D group communication; the group wireless side ID list is a wireless side ID list of D2D UE groups which are served by the control node.

The wireless resource configuration information includes the subframe pattern information; the subframe pattern information indicates the time domain information of serving the D2D UE served by the control node.

Herein, the sending unit and the receiving unit can be implemented by hardware such as a Digital Signal Processor (DSP) or a Central Processing Unit (CPU); the information processing unit is implemented by hardware such as a DSP or a CPU.

Embodiment 6

Figure 7:
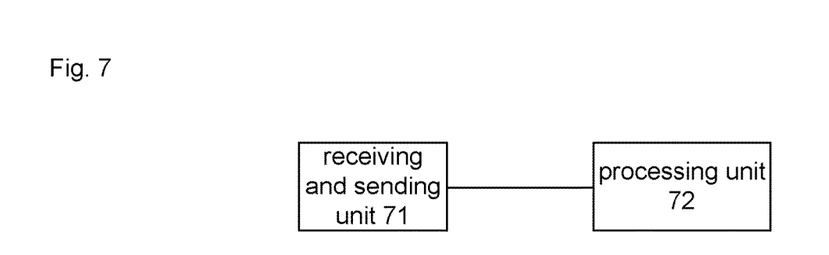
FIG. 7 is a second structure diagram of a control node according to the disclosure.

As shown in FIG. 7, a control node provided by the present embodiment includes: a receiving and sending unit 71 and a processing unit 72; wherein, the receiving and sending unit 71 is configured to, after a D2D UE is determined as the control node, send and receive the control node information via the air interface, and send the received control node information to the processing unit; and the processing unit 72 is configured to use the control node information to allocate resources.

The control node information includes at least one of: control node ID information, level information, subframe pattern information, wireless resource configuration information, information about a group ID list, information about a D2D UE wireless side ID list, information about a group wireless side ID list, and information about a mapping table of group IDs and group wireless side IDs.

The processing unit 72 is specifically configured to: configure, according to the received control node information, D2D UEs managed by the control node with different wireless resources; and/or, stagger, in the time domain, resources of all D2D UEs managed by the control node and of D2D UEs managed by other control nodes.

The receiving and sending unit can be implemented by hardware such as a DSP or CPU, and other hardware; the processing unit is implemented by hardware such as a DSP or CPU.

The above is only the preferred embodiments of the disclosure and not intended to limit the scope of the claims of the disclosure.

What is claimed is:

1. A method for selecting a control node, comprising:
   sending, by a first Device-to-Device (D2D) User Equipment (UE), control node broadcast information, wherein the control node broadcast information comprises: type indication information which is used for indicating whether the first D2D UE has a control node identity; and
   determining the first D2D UE as the control node,
   wherein sending, by the first D2D UE, the control node broadcast information comprises:
   sensing, by the first D2D UE, a carrier frequency for D2D communication, and determining whether control node pre-broadcast information sent by a neighbouring D2D UE is received; if the control node pre-broadcast information is received, comparing whether a collision resolution Identification (ID) value of the neighbouring D2D UE is less than a collision resolution ID value of the first D2D UE; if yes, sending the control node broadcast information; or else, performing no operations; or
   sensing, by the first D2D UE, the carrier frequency for D2D communication; if the first D2D UE receives the control node broadcast information sent by other control nodes, and the signal intensity of the control node broadcast information sent by other control nodes is less than a preset threshold, sending, by the first D2D UE, the control node broadcast information; or
   if the first D2D UE is preconfigured as the control node, sending, by the first D2D UE, the control node broadcast information;
   wherein the control node pre-broadcast information comprises: the collision resolution ID value, the collision resolution ID value being calculated by the D2D UE according to specified parameters or selected randomly, or the control node pre-broadcast information comprises the collision resolution ID value and at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

2. The method according to claim 1, wherein the control node broadcast information comprises at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

3. The method according to claim 1, further comprising:
   sending, by the first D2D UE, control node pre-broadcast information, wherein the control node pre-broadcast information comprises: the collision resolution ID value, the collision resolution ID value being calculated by the D2D UE according to specified parameters or selected randomly, or the control node pre-broadcast information comprises the collision resolution ID value and at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

4. The method according to claim 3, further comprising: before sending, by the first D2D UE, the control node pre-broadcast information, determining, by the first D2D UE, whether the control node broadcast information or the control node pre-broadcast information is received at the carrier frequency for D2D communication; if the control node broadcast information or the control node pre-broadcast information is received, determining whether the signal intensity of the received control node broadcast information or control node pre-broadcast information is greater than the preset threshold;
   further comprising: after sending, by the first D2D UE, the control node pre-broadcast information, determining whether the control node pre-broadcast information sent by the neighbouring D2D UE is received.

5. A method for a control node to allocate resources, comprising:
   after a first Device-to-Device (D2D) User Equipment (UE) is determined as the control node, sending and receiving, by the first D2D UE, control node information via an air interface, wherein the control node information comprises at least one of: control node Identification (ID) information, level information, subframe pattern information, wireless resource configuration information, information about a group ID list, information about a D2D UE wireless side ID list, information about a group wireless side ID list, and information about a mapping table of group IDs and group wireless side IDs; and using, by the first D2D UE, the control node information to allocate resources, wherein using, by the first D2D UE, the control node information to allocate resources comprises:

staggering in the time domain, by the first D2D UE according to the received control node information, wireless resources for sending information between the neighbouring control node and the first D2D UE and wireless sources used for serving all D2D UEs managed by the first D2D UE.

6. A control node, comprising:

a memory storing processor-executable instructions; and a processor arranged to execute the stored processor-executable instructions to perform steps of:

sending, by a first Device-to-Device (D2D) User Equipment (UE), control node broadcast information, wherein the control node broadcast information comprises: type indication information which is used for indicating whether the first D2D UE has a control node identity; and the first D2D UE as the control node, wherein sending, by the first D2D UE, the control node broadcast information comprises:

sensing, by the first D2D UE, a carrier frequency for D2D communication, and determining whether control node pre-broadcast information sent by a neighbouring D2D UE is received; if the control node pre-broadcast information is received, comparing whether a collision resolution Identification (ID) value of the neighbouring D2D UE is less than a collision resolution ID value of the first D2D UE; if yes, sending the control node broadcast information; or else, performing no operations; or sensing, by the first D2D UE, the carrier frequency for D2D communication; if the first D2D UE receives the control node broadcast information sent by other control nodes, and the signal intensity of the control node broadcast information sent by other control nodes is less than a preset threshold, sending, by the first D2D UE, the control node broadcast information; or if the first D2D UE is preconfigured as the control node, sending, by the first D2D UE, the control node broadcast information;

wherein the control node pre-broadcast information comprises: the collision resolution ID value, the collision resolution ID value being calculated by the D2D UE according to specified parameters or selected randomly, or the control node pre-broadcast information comprises the collision resolution ID value and at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

7. The control node according to claim 6, wherein the control node broadcast information comprises at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

8. The control node according to claim 6, wherein the processor is arranged to execute the stored processor-executable instructions to further perform a step of:

sending, by the first D2D UE, control node pre-broadcast information, wherein the control node pre-broadcast information comprises: the collision resolution ID value, the collision resolution ID value being calculated by the D2D UE according to specified parameters or selected randomly, or the control node pre-broadcast information comprises the collision resolution ID value and at least one of: control node ID information, synchronization information, an effective duration, level information, access related information, wireless resource configuration information, information about a group ID list, information about a D2D UE wireless side ID list, information about a group wireless side ID list, and information about a mapping table of group IDs and group wireless side IDs.

9. The control node according to claim 8, wherein the processor is arranged to execute the stored processor-executable instructions to further perform a step of: before sending, by the first D2D UE, the control node pre-broadcast information, determining whether the control node broadcast information or the control node pre-broadcast information is received at the carrier frequency for D2D communication, and if the control node broadcast information or the control node pre-broadcast information is received, determining whether the signal intensity of the received control node broadcast information or control node pre-broadcast information is greater than the preset threshold;

after sending, by the first D2D UE, the control node pre-broadcast information, determining whether the control node pre-broadcast information sent by the neighbouring D2D UE is received.

10. A control node, comprising:

a memory storing processor-executable instructions; and a processor arranged to execute the stored processor-executable instructions to perform steps of:

after a first Device-to-Device (D2D) User Equipment (UE) is determined as the control node, sending and receiving, by the first D2D UE, control node information via an air interface, wherein the control node information comprises at least one of: control node Identification (ID) information, level information, subframe pattern information, wireless resource configuration information, information about a group ID list, information about a D2D UE wireless side ID list, information about a group wireless side ID list, and information about a mapping table of group IDs and group wireless side ID; and using, by the first D2D UE, the control node information to allocate resources, wherein using, by the first D2D UE, the control node information to allocate resources comprises:

staggering in the time domain, by the first D2D UE according to the received control node information, wireless resources for sending information between the neighbouring control node and the first D2D UE and wireless sources used for serving all D2D UEs managed by the first D2D UE.

* * * * *